J. A. BRANTLEY.
DRIVE GEARING FOR MINING MACHINES.
APPLICATION FILED FEB. 12, 1918.
1,297,647.
Patented Mar. 18, 1919.
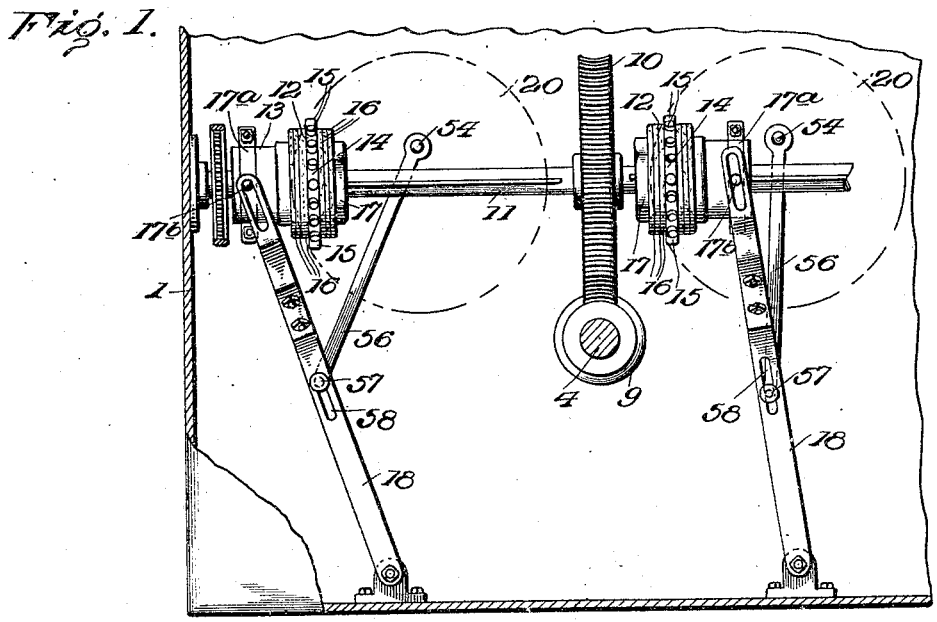
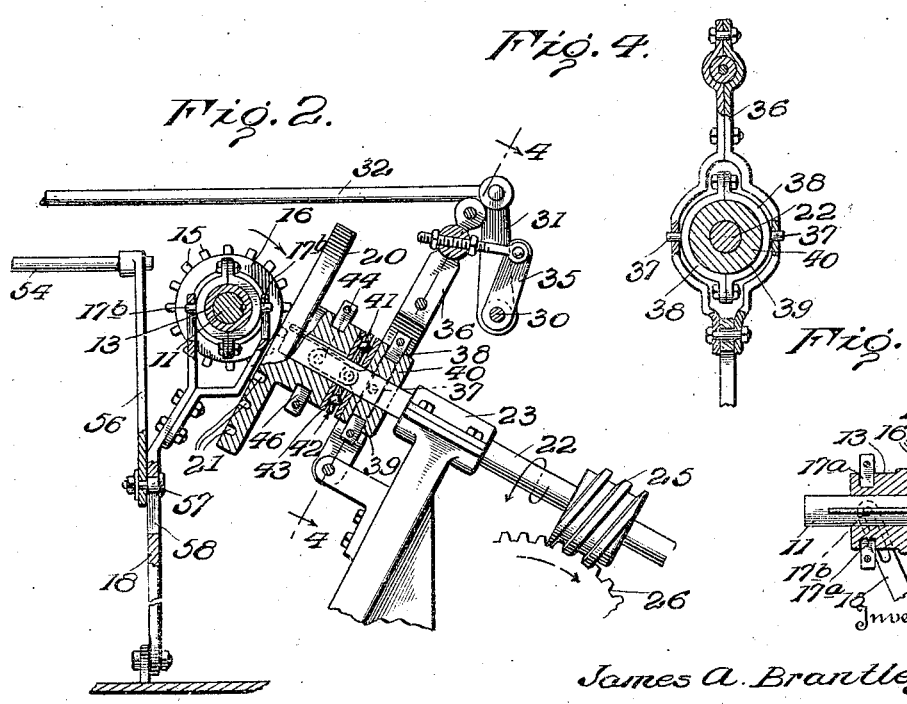

UNITED STATES PATENT OFFICE.

JAMES A. BRANTLEY, OF SAND SPRINGS, OKLAHOMA.

DRIVE-GEARING FOR MINING-MACHINES.

1,297,647.   Specification of Letters Patent.   Patented Mar. 18, 1919.

Original application filed February 3, 1917, Serial No. 146,414. Divided and this application filed February 12, 1918. Serial No. 216,717.

*To all whom it may concern:*

Be it known that I, JAMES A. BRANTLEY, a citizen of the United States, residing at Sand Springs, in the county of Tulsa and State of Oklahoma, have invented certain new and useful Improvements in Drive-Gearing for Mining-Machines, of which the following is a specification.

My present invention pertains to drive gearing designed more especially for use in the mining machine constituting the subject of my contemporary application filed February 3, 1917, Serial No. 146,414, of which this application is a division.

The novelty, utility and practical advantages of my improved drive gearing will be fully understood from the following description and claims when the same are read in connection with the drawings, accompanying and forming part of this specification, in which:

Figure 1 is a transverse section of a portion of a mining machine embodying my novel gearing.

Fig. 2 is a section taken at right angles to Fig. 1.

Fig. 3 is a detail section of one of the compound gears.

Fig. 4 is a detail section on line 4—4 of Fig. 2.

Similar numerals of reference designate corresponding parts in all of the views of the drawings.

I show in Fig. 1 the shaft 4 of an electric motor which is to be considered as an example of the driving means of my appended claims.

Fixed on the said shaft 4 is a worm 9, and intermeshed with and driven by said worm 9 is a worm wheel 10, fixed on a transverse shaft 11, extending between and journaled in the side walls of a body 1. Mounted to slide on and turn with said shaft 11, at opposite sides of the worm wheel 10 are combined friction and spur gears 12. These gears 12 respectively comprise a soft steel hub 13, Fig. 3, feathered on the shaft 11, a central steel disk 14 loosely though snugly mounted on the hub 13 and having peripheral teeth 15, friction sections 16, of paper or fiber, loosely mounted on the hub 13 at opposite sides of the disk 14 and arranged with their smooth perimeters flush with the bottoms of the interdental spaces in the disk 14, and a nut 17 threaded on the hub 13 and adapted to tighten the disk 14 and the sections 16 against a flange on the hub. In the outer portions of the hubs 13 of the compound gears 12 are circumferential grooves in which are sectional rings 17ª having studs 17ᵇ, disposed in upright bifurcated levers 18 through the medium of which the compound gears 12 are moved horizontally on the shaft 11.

Each of the gears 12 is arranged back of and opposed to an inclined steel disk 20, and each disk 20 is provided in its face with three (more or less) circular series of indentures 21; the indentures of each series being spaced to receive the teeth 15 of the gears 12. The disks 20 are feathered on forwardly and downwardly inclined shafts 22 which are journaled in bearings 23 in body 1 and are designed to be connected through worms 25 with worm wheels 26 or other means to be driven. One of the said shafts 22 is clearly shown in Fig. 2.

In front of the disks 20 is a transverse shaft 30 on which is fixed an arm 31 to which is connected a rearwardly extending operating rod 32. Also fixed on the shaft 30 are arms 35, one of which is shown in Fig. 2. Connected with the arms 35, preferably in an adjustable manner, are yoke levers 36, one of which is shown in Figs. 2 and 4. Mounted at 37 in the said yoke levers are studs on sectional rings 38 which studs are disposed in circumferential grooves 39 in steel members 40 loose on the shaft 22 and arranged back of the hubs on the disks 20. Between each of the said members 40 and each of the disk hubs are interposed a steel race annulus 41 and a steel ring 42 in which are anti-friction balls 43, interposed between the member 40 and the ring 42 and adapted to lessen the friction when the disk 20 is thrust against its complementary gear 12. For the purpose of enabling each lever 36 to pull its respective disk 20 away from the coöperating gear 12, links 44 are pivoted to the sides of each lever 36. The rear portion of said links 44 receive pins on a sectional ring 46 disposed in the circumferential groove 47 of the disk hub.

For the purpose of moving the compound gears 12 relative to the centers of the disks 20 I provide longitudinal rock shafts 54. At their forward ends the shafts 54 are provided with arms 56. These arms are connected by pins 57 with the levers 18; the said pins being disposed and movable in slots 58 of the lever 18, as illustrated.

As before stated the gears 12 are adapted to be moved by the levers 18 lengthwise of the shaft 11, and by so moving said gears 12 and changing their positions relative to the centers of the disks 20, the speed of the shafts 22 can be varied. Again when the gears 12 are moved across the centers of the disks 20 the direction of rotation of the shafts 22 is reversed but the same variations of speed are available as in the first instance. Moreover, it is to be noted that the said construction constitutes positive driving connections for the independent operation of the shafts 22 so that one shaft 22 may be rotated in one direction and the other shaft 22 in the opposite direction; also, that the three series of indentures in each disk 20 afford positive driving connections at three different speeds in opposite directions.

I prefer to provide each disk 20 with three series of indentures 21 but it is obvious that the number of the series may be increased or diminished in the discretion of the manufacturer of the gearing without affecting my invention.

Having described my invention, what I claim and desire to secure by Letters Patent, is:

1. The combination with a rotatable shaft; of a compound gear carried by said shaft, said gear comprising a hub feathered upon the shaft, a metallic disk pivoted upon the hub and provided upon its periphery with radially extending teeth, fibrous friction members arranged upon the hub upon opposite sides of the metallic disk and having their peripheries substantially flush with the periphery of the metallic disk, and means to bind the friction members to the metallic disk; means to shift the gear longitudinally of the shaft; and a driven disk arranged at substantially a right angle to said gear and having a substantially flat face, said face being provided with a plurality of concentric annular sets of depressions for coaction with the radial teeth of said gear.

2. The combination with a rotatable shaft; of a compound gear carried by said shaft, said gear comprising a hub feathered upon the shaft, a metallic disk pivoted upon the hub and provided upon its periphery with radially extending teeth, fibrous friction members arranged upon the hub upon opposite sides of the metallic disk and having their peripheries substantially flush with the periphery of the metallic disk, and means to bind the friction members to the metallic disk; means to shift the gear longitudinally of the shaft; a second shaft arranged at substantially a right angle to the first named shaft; a driven disk feathered upon the second named shaft and having a substantially flat face, said face being provided with a plurality of concentric annular sets of depressions for coaction with the radial teeth of said gear; and means to shift the driven disk longitudinally of its shaft.

In testimony whereof I affix my signature in presence of two witnesses.

JAMES A. BRANTLEY.

Witnesses:
P. A. SMITH,
J. S. NICHOLAS.

Copies of this patent may be obtained for five cents each, by addressing the "Commissioner of Patents, Washington, D. C."